J. J. RITTER.
LAMP SHADE.
APPLICATION FILED MAR. 1, 1911.
993,877.
Patented May 30, 1911.
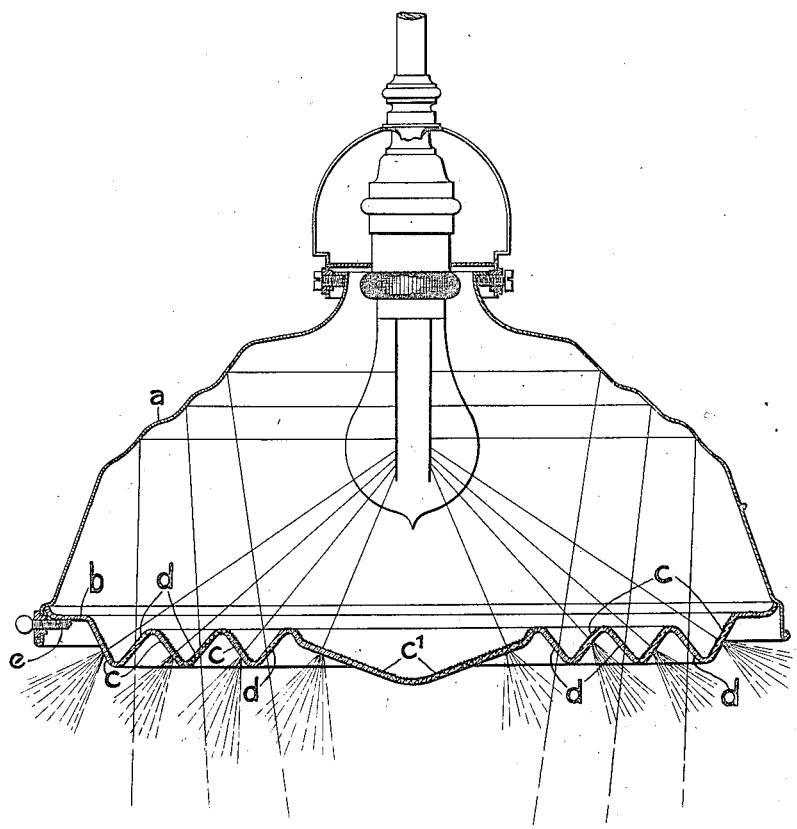

UNITED STATES PATENT OFFICE.

JOHANN JAKOB RITTER, OF BASEL, SWITZERLAND.

LAMP-SHADE.

993,877. Specification of Letters Patent. Patented May 30, 1911.

Application filed March 1, 1911. Serial No. 611,626.

*To all whom it may concern:*

Be it known that I, JOHANN JAKOB RITTER, a citizen of the Swiss Republic, and resident of Basel, Switzerland, have invented new and useful Improvements in Lamp-Shades, of which the following is a full, clear, and exact specification.

This invention relates to lamp-shades, and has for its object to provide a shade especially adapted for the rational and hygienic illumination of workrooms.

According to the invention the improved shade comprises an upper reflector, and a lower glass distributer provided with concentric corrugations, the said corrugations on one side of the crest or apex being translucent (mat, frosted, diamond pressed, etc.), and upon the other side transparent, so that that portion of the light rays which enters the eye is diffused or scattered, while the portion thrown back from the reflector passes unhindered through the transparent portions of said distributer. In this manner the light rays which would otherwise fall direct on to the eye, have their intense glare dulled by the light destroying portions of the glass distributer while those rays which are thrown back by the reflector, and which by reason of their indirect path are of less brilliance, can penetrate uninfluenced through the transparent glass portions, whereby an excellent light is obtained as regards strength and blinding.

To enable the invention to be fully understood I will describe it by reference to the accompanying drawing which shows one form of carrying out the invention in sectional elevation.

$a$ is the upper reflector and $b$ the lower glass distributer which is in the form of a plate and is provided with concentric corrugations around a central translucent portion $c^1$, the said corrugations, on one side of the crest or apex being, as at $c$, translucent (mat, frosted, etc.), and on the other side that is to say, at $d$, being quite transparent, so that that portion of the light rays which enters the eye is diffused or scattered, while the portion of the said light rays thrown back from the reflector, passes unhindered through the transparent portions of the glass. The reflector, which is of metal or frosted glass, or of other suitable material, is properly shaped and provided with corrugations such that the light rays reflected by it receive the proper path or direction to cause them to pass downward through the transparent portions $d$ of the corrugations of the glass distributer.

The glass distributer $b$ is detachably suspended to the reflector $a$, for example, by means of the screws $e$.

What I claim is:

1. A lamp-shade consisting of an upper reflector and a lower glass distributer provided with concentric corrugations, the said corrugations being translucent on one side of the apex or crest, and on the other side transparent so that that portion of the light rays which meets the eye is diffused or scattered, while the portion reflected from the reflector passes unhindered through the transparent portions of the glass distributer.

2. A lamp-shade consisting of an upper reflector and a lower glass distributer provided with concentric corrugations, the said corrugations being translucent on one side of the apex or crest, and on the other side transparent so that that portion of the light rays which meets the eye is diffused or scattered, while the portion reflected from the reflector passes unhindered through the transparent portions of the glass distributer, said reflector being provided with corrugations in order to give the proper direction to the rays reflected by it, such that they pass through the transparent portions of the glass distributer.

In witness whereof I have hereunto signed my name this 17th day of February 1911, in the presence of two subscribing witnesses.

JOHANN JAKOB RITTER.

Witnesses:
 GEO. GIFFORD,
 AMAND BRAUN.